United States Patent
LeFebvre et al.

(10) Patent No.: US 7,698,962 B2
(45) Date of Patent: Apr. 20, 2010

(54) FLEXIBLE SENSOR INTERFACE FOR A RAILCAR TRUCK

(75) Inventors: William LeFebvre, West Chester, PA (US); Michael J. McCann, Wilmington, DE (US); Frank Backo, III, Olyphant, PA (US); Andrew H. Martin, West Chester, PA (US)

(73) Assignee: Amsted Rail Company, Inc., Granite City, IL (US)

( * ) Notice: Subject to any disclaimer, the term of this patent is extended or adjusted under 35 U.S.C. 154(b) by 12 days.

(21) Appl. No.: 11/615,341

(22) Filed: Dec. 22, 2006

(65) Prior Publication Data

US 2007/0255509 A1    Nov. 1, 2007

Related U.S. Application Data

(60) Provisional application No. 60/795,691, filed on Apr. 28, 2006.

(51) Int. Cl.
*G01L 1/04* (2006.01)
*G01G 19/12* (2006.01)

(52) U.S. Cl. ............ 73/862.621; 73/768; 73/774; 73/862.041; 177/136

(58) Field of Classification Search ............ 73/768, 73/774–781, 862.041, 862.044, 862.621; 177/136

See application file for complete search history.

(56) References Cited

U.S. PATENT DOCUMENTS

| | | | | |
|---|---|---|---|---|
| 3,718,040 A | | 2/1973 | Freeman et al ............... | 73/146 |
| 4,503,705 A | * | 3/1985 | Polchaninoff ............... | 73/172 |
| 4,812,826 A | | 3/1989 | Kaufman et al ............ | 340/682 |
| 5,140,849 A | | 8/1992 | Fujita et al ................. | 73/593 |
| 5,347,871 A | * | 9/1994 | D'Andrea et al ........... | 73/775 |
| 5,372,435 A | | 12/1994 | Genero et al ............... | 384/448 |
| 5,381,090 A | | 1/1995 | Adler et al ................. | 324/174 |
| 5,381,692 A | | 1/1995 | Winslow et al ............. | 73/593 |
| 5,440,184 A | | 8/1995 | Samy et al ................. | 310/90 |
| 5,446,451 A | | 8/1995 | Grosskopf, Jr. ........... | 340/682 |
| 5,642,944 A | * | 7/1997 | Dublin et al .............. | 384/102 |
| 5,682,139 A | | 10/1997 | Pradeep et al ............ | 340/539 |
| 6,127,672 A | * | 10/2000 | Danisch ................. | 250/227.14 |
| 6,161,962 A | | 12/2000 | French et al ............. | 384/459 |

(Continued)

FOREIGN PATENT DOCUMENTS

GB    2 295 207    5/1996

(Continued)

OTHER PUBLICATIONS

Eric Smalley, "Flexible Sensors Make Robot Skin", available on the internet at <http://www.trnmag.com>, 2004.*

*Primary Examiner*—David A. Rogers
(74) *Attorney, Agent, or Firm*—Fox Rothschild, LLP

(57) ABSTRACT

A sensor interface is disclosed including a flexible substrate in which are embedded sensors for measuring physical parameters such as temperature, displacement, velocity, acceleration, stress, strain, pressure and force present between objects such as a railcar bearing and a truck side frame. The substrate is positioned between the objects of interest Electronic components such as a data processing unit, a data storage device, a communication device and a power source may also be embedded within the substrate. The electronic devices communicate with one another and the sensors to process signals generated by the sensors indicative of the parameters being measured.

35 Claims, 3 Drawing Sheets

U.S. PATENT DOCUMENTS

| | | | |
|---|---|---|---|
| 6,179,471 B1 | 1/2001 | Moretti et al. | 384/448 |
| 6,263,265 B1 | 7/2001 | Fera | 701/19 |
| 6,301,531 B1 | 10/2001 | Pierro et al. | 701/29 |
| 6,441,324 B1 * | 8/2002 | Stimpson | 177/137 |
| 6,535,135 B1 | 3/2003 | French et al. | 340/682 |
| 6,668,216 B2 | 12/2003 | Mays | 701/19 |
| 6,695,483 B2 | 2/2004 | Sakatani et al. | 384/448 |
| 6,882,851 B2 | 4/2005 | Sugar et al. | 455/454 |
| 6,945,098 B2 * | 9/2005 | Olson | 73/86 |
| 6,948,856 B2 | 9/2005 | Takizawa et al. | 384/448 |
| 7,014,368 B2 | 3/2006 | Morita et al. | 384/448 |
| 7,018,106 B2 | 3/2006 | Okada | 384/448 |
| 7,034,660 B2 | 4/2006 | Watters et al. | 340/10.41 |
| 2003/0146821 A1 * | 8/2003 | Brandt | 340/10.1 |
| 2004/0126043 A1 * | 7/2004 | Ito | 384/448 |
| 2004/0251058 A1 | 12/2004 | Carr et al. | 177/136 |
| 2005/0028596 A1 * | 2/2005 | Gall | 73/715 |
| 2005/0194497 A1 | 9/2005 | Matzan | 246/169 A |
| 2005/0268813 A1 | 12/2005 | Van Auken | 105/281.1 |
| 2006/0042734 A1 * | 3/2006 | Turner et al. | 152/154.2 |
| 2006/0080048 A1 | 4/2006 | Kessler et al. | 702/35 |
| 2006/0154398 A1 * | 7/2006 | Qing et al. | 438/48 |
| 2006/0158181 A1 * | 7/2006 | Shoji | 324/240 |
| 2006/0207336 A1 * | 9/2006 | Miyazaki | 73/760 |
| 2006/0243068 A1 * | 11/2006 | Ueno et al. | 73/862.322 |
| 2007/0018083 A1 * | 1/2007 | Kumar et al. | 250/227.14 |
| 2007/0095160 A1 | 5/2007 | Georgeson et al. | 73/866 |
| 2007/0096904 A1 * | 5/2007 | Lockyer et al. | 340/545.1 |
| 2007/0152107 A1 | 7/2007 | LeFebvre et al. | 264/169 R |
| 2007/0186642 A1 * | 8/2007 | Sano et al. | 73/172 |
| 2007/0208841 A1 | 9/2007 | Barone et al. | 709/223 |
| 2008/0064941 A1 * | 3/2008 | Funderburk et al. | 600/347 |

FOREIGN PATENT DOCUMENTS

| | | | |
|---|---|---|---|
| JP | 63236937 A | * | 10/1988 |
| JP | 05297093 A | * | 11/1993 |
| WO | WO01/15001 | | 3/2001 |

* cited by examiner

FLEXIBLE SENSOR INTERFACE FOR A RAILCAR TRUCK

FIELD OF THE INVENTION

This invention relates to engineering elements for monitoring and maintaining effective functioning of machines or installations. More specifically, it relates to elastomeric substrates positioned between relatively rigid objects to attenuate shock or vibration, prevent abrasion or control movement, the substrates containing embedded sensors to measure static or dynamic loads, load position, shear forces, temperature or other parameters of interest, as well as data processing and storage devices to interpret signals from the sensors and communication devices to transmit the data from the sensors to an end user for evaluation.

BACKGROUND OF THE INVENTION

While there are many applications of sensors attached to rigid objects to measure stresses therein, and sensors that can measure the relative movement between such objects and sensors that are built in to various materials of construction (often called "smart materials"), these sensors are not embedded inside elastomeric or compliant substrates which also serve a mechanical interfacing role to allow the objects to move slightly relative to each other.

Some sensors are built into flexible objects like gloves in order to provide haptic feedback in robotic and other human interface applications. These configurations do not provide the desired sustained interface between two rigid objects.

The benefits of this invention are the provision of compliance, sensing data processing and communications functions within one item which can be installed in the place of a similarly shaped substrate devoid of any sensor.

OBJECTS OF THE INVENTION

The object of this invention is to provide a deformable, load-bearing substrate which provides a compliant interface between relatively rigid objects and which contains embedded and enclosed within itself one or more sensors that can detect and communicate the conditions in the substrate, such as temperature and/or various stresses and the distributions thereof, thus, providing a means for monitoring, either continuously or periodically, the interactions between the solid objects and the conditions prevailing at or near their interface.

SUMMARY OF THE INVENTION

The invention concerns an interface positionable between two objects. The interface comprises a flexible substrate having a first surface that interfaces with one of the objects and a second surface that interfaces with another of the objects. At least one sensor is embedded within the flexible substrate. The sensor is adapted to measure a parameter such as voltage differential, luminous intensity, sound intensity, heat flux, electrical current, moisture diffusion, chemical species diffusion, magnetic flux, neutron flux, ionizing radiation, temperature, displacement, velocity, acceleration, stress, strain, pressure, and force and combinations thereof. The sensor generates an electrical signal indicative of the parameter. The interface also includes a data processing unit in communication with the sensor for receiving and processing the signals generated by the sensor. A communication device adapted to transmit data from the data processing unit is also part of the interface, as well as a power source which provides electrical power to the sensor, the data processing unit and the communication device.

The data processing unit may comprise a component such as a microprocessor, an application specific integrated circuit, a field programmable gate array, as well as a digital signal processing device and combinations thereof.

In one embodiment, the communication device comprises a radio transmitter and receiver, which devices may be embedded within the substrate.

The power source may comprise a component such as an electric battery, a fuel cell, as well as a radio isotope electric generator. Again, any of these devices may be embedded within the substrate.

In a particular embodiment, an appendage may extend from the substrate and be positioned externally to the space between the objects. Various components, such as the data processing unit, the power source and the communication device may be embedded within the appendage.

The invention also encompasses a method of measuring and evaluating a physical parameter at an interface between two objects. The method comprises:

(a) providing a flexible substrate positioned between the objects, the substrate comprising at least one sensor embedded therein;

(b) measuring the parameter using the sensor, the sensor generating electrical signals indicative of the parameter;

(c) providing a data processing unit in communication with the sensor;

(d) providing a communication device adapted to transmit data from the data processing unit;

(e) providing a power source for powering the sensor, the data processing unit and the communication device;

(f) the data processing unit receiving the signals from the sensor;

(g) the data processing unit performing operations on the signals, the operations including averaging, filtering, comparing, scaling, calibrating, spectral analysis, encryption and analog to digital conversion and combinations thereof; and (h) the communication device transmitting information derived from the signals by the data processing unit.

The parameters that may be measured include, for example, voltage differential, luminous intensity, sound intensity, heat flux, electrical current, moisture diffusion, chemical species diffusion, magnetic flux, neutron flux, ionizing radiation, temperature, displacement, velocity, acceleration, stress, strain, pressure, and force and combinations thereof.

DETAILED DESCRIPTION OF THE EMBODIMENTS

Figure 1:
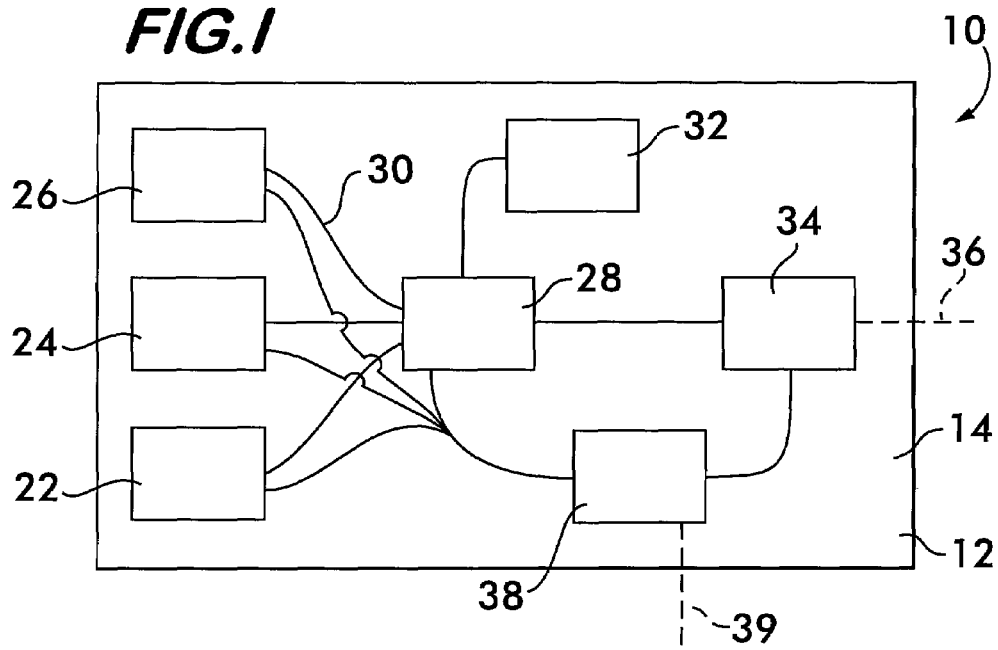
FIG. 1 is a schematic diagram depicting an interface according to the invention.
Figure 2:
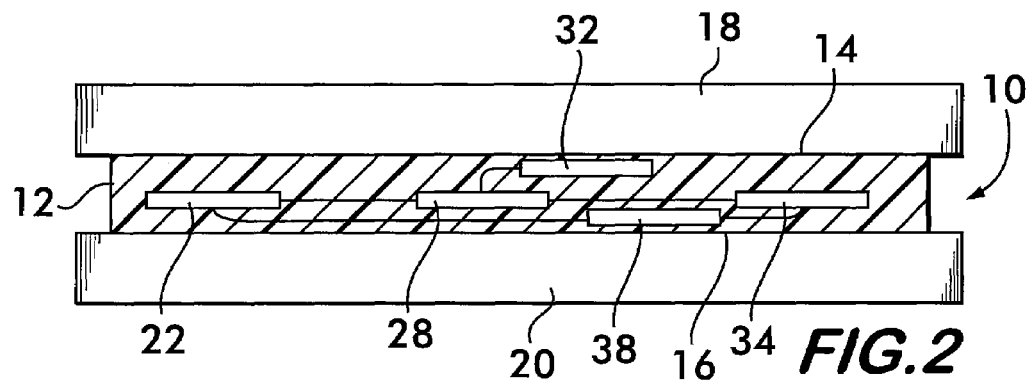
FIG. 2 is a partial sectional view of the interface shown in FIG. 1.

FIGS. 1 and 2 show a sensor interface 10 according to the invention. Interface 10 comprises a flexible substrate 12 having a first surface 14 and a second surface 16, each surface being engageable with a respective object 18 and 20. The objects are shown in FIG. 2 as thick plates by way of example only. It is anticipated that the objects will comprise components between which sustained, varying loads or forces will occur or for which other types of measurable physical parameters will be of interest, such as voltage differential, luminous intensity, sound intensity, heat flux, electrical current, moisture diffusion, chemical species diffusion, magnetic flux, neutron flux, ionizing radiation, temperature, displacement, velocity, acceleration, stress, strain, pressure, and force and combinations thereof. Examples of such objects include heavy machine tools and their bases, engines and their mountings, buildings and their foundations, as well as wheel bearings and their support structures.

A plurality of sensors 22, 24 and 26 are embedded within the substrate, the sensors comprising transducers which convert a physical parameter, such as voltage differential, luminous intensity, sound intensity, heat flux, electrical current, moisture diffusion, chemical species diffusion, magnetic flux, neutron flux, ionizing radiation, force, temperature, displacement, velocity, acceleration, stress, strain or pressure into electrical signals indicative of the parameter. To this end, the sensors types include load cells, thermistors, linear variable displacement transducers, accelerometers, strain gages, piezoelectric devices, magnetometers, bolometers, Geiger counters sonometers and the like.

Electrical signals from the sensors are sent to a data processing unit 28 over communication links 30, which could be, for example, electrical conductors, optical fibers or wireless communication links. The data processing unit may be, for example, a microprocessor, an application specific integrated circuit, a field programmable gate array as well as a digital signal processing device which receives and interprets the signals from the sensors according to software operating within the device. Analog signal conditioning devices as well as other analog electrical circuits may also be a part of the data processing unit. The data processing unit may also be linked to a data storage device 32, such as a disk drive or a solid state random access memory unit when large amounts of data must be stored and processed.

The data processing unit communicates with a communication device 34. Communication device 34 may be, for example, a radio transmitter and receiver under the control of the data processing unit that sends and receives information to other devices outside of the substrate 12. Alternatively, communication may also be effected by a physical link 36, such as an electrical conductor or optical fiber that extends out from the substrate 12. In this embodiment, the device 34 may be an electrical signal amplifier or an optical signal generator respectively, which feeds appropriate signals from the data processing unit to the physical link 36.

The various devices and sensors receive electrical power from a power source 38, which may comprise an electric battery, a fuel cell or a radio isotope electric generator to cite a few examples. The power source may be solar powered or may be a generator which derives energy from relative motion between the objects 18 and 20. The power source may also be a device, such as a vibrating magnetic induction device, which derives energy from the motion of the interface sensor itself. Alternatively, power may be obtained from an external source over a physical link 39, such as an electrical conductor or means for delivering fuel. In this embodiment, component 38 may be for example, a transformer or a power conditioning unit used to provide appropriate voltages and currents to the various components.

Figure 3:
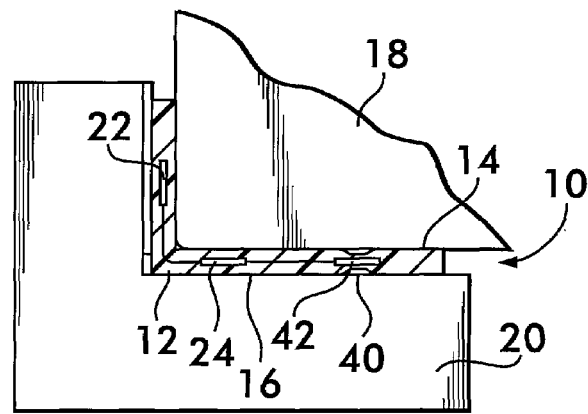
FIG. 3 is a partial sectional view of an embodiment of an interface according to the invention.

As shown in FIG. 3, sensor interface 10 is versatile and adaptable and can be arranged, molded and constructed as required for a particular application.

In this embodiment, a corner interface is illustrated capable of measuring forces or fluxes, in different directions by the appropriate placement and orientation of the sensors. Of particular interest are the dimples 40 which are positioned within the surface or surfaces 14 and 16 of the substrate 12 in overlying relation with one or more of the electrical components 42 embedded within the substrate. Use of such dimples is intended to relieve stress on the electronic components caused by forces between the objects 18 and 20, in the surfaces of which similar dimples for stress relief may alternatively or additionally be provided.

Figure 4:
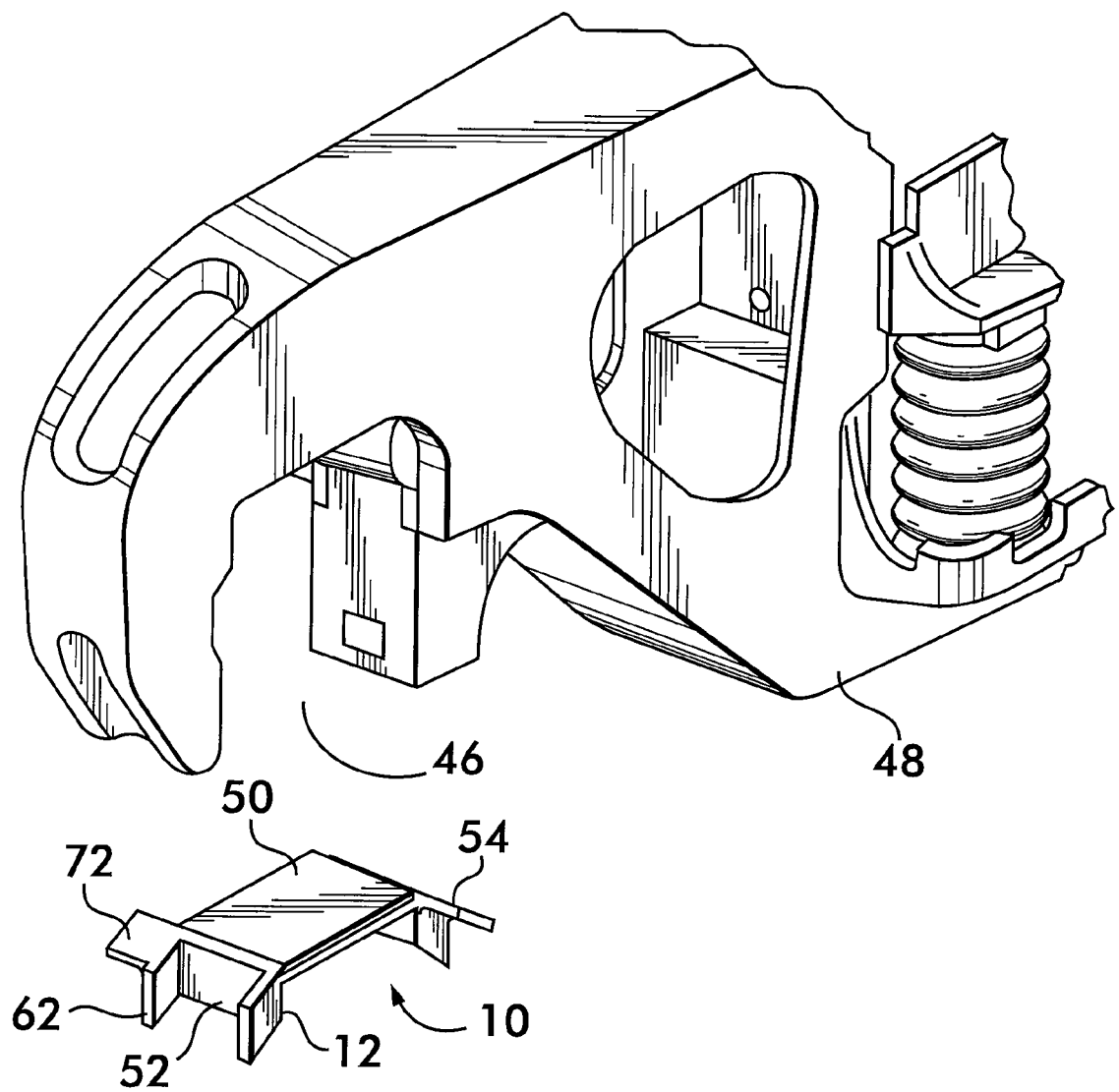
FIG. 4 is an exploded view of a portion of a railcar side frame with an interface between the side frame and a bearing adapter.

FIG. 4 illustrates a specific example of a sensor interface 10 positioned between a bearing adapter 44 and the side frame 48 of a railcar truck or bogie within a retainer pocket 46 formed by the side frame 48 as shown. The retainer pocket 46 is also referred to in the industry as a pedestal pocket 46 formed in a pedestal portion of the side frame 48. In this embodiment, the adaptability of the invention is again evidenced. The sensor interface comprises a load bearing pad 50 formed of a flexible, resilient polymer which damps vibration and vertical, horizontal and longitudinal loads between the bearing adapter 44 and the side frame 48. Such pads are typically of the type described in U.S. Published application No. 2005/0268813. Sensors and electronic devices are embedded within fore and aft interface portions 52 and 54 which are shaped to accommodate the bearing adapter and side frame pocket.

Figure 5:
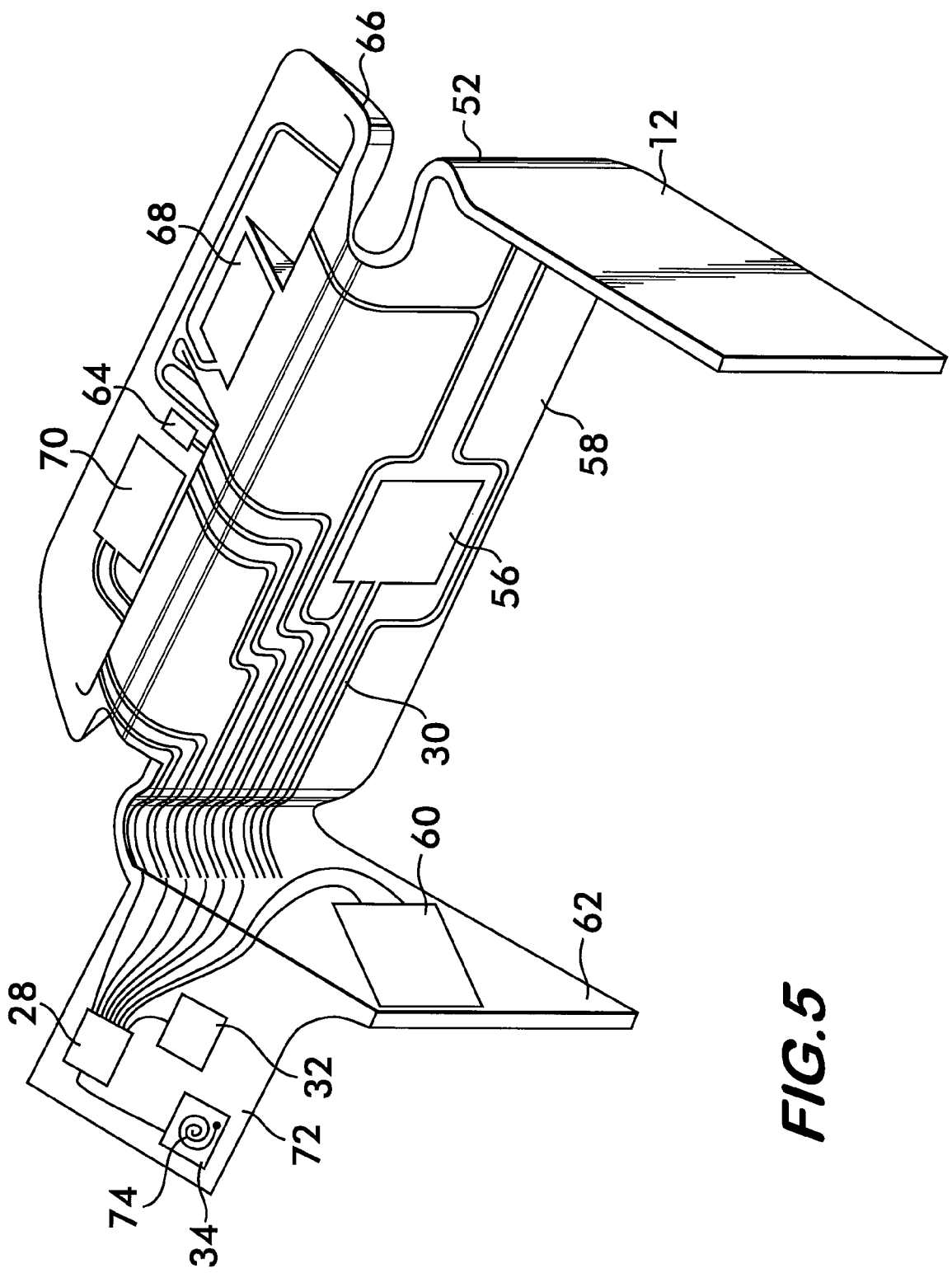
FIG. 5 is a detailed view of a portion of the interface shown in FIG. 4.

The pad portion 52 is shown in detail in FIG. 5 and comprises a flexible, resilient substrate 12 in which the sensors and electronic components are embedded. In this example, a load sensor 56 is positioned in a facing vertically oriented portion 58 of the substrate, allowing it to measure forces between the wheel and side frame as would be caused by braking or during truck instability, such as hunting. Another load sensor 60 is positioned within a substrate wing portion 62 oriented in a plane perpendicular to the portion 58 for measuring lateral loads between the wheel and side frame. A thermistor 64 is embedded within a horizontal portion 66 of the substrate for measuring bearing temperature. Another load sensor 68 is positioned on the horizontal portion 66 for measuring vertical loads between the bearing adapter and the side frame. An energy scavenging device 70, for example, a piezoelectric substrate, is also advantageously positioned on this substrate portion to generate electrical energy from the stresses induced by vertical motion of the bearing adapter relative to the side frame to power the various components.

Communication links 30, which could be electrical conductors or optical fibers, for example, connect the various sensors and energy generating device to the data processing unit 28. The data processing unit, along with the data storage device 32 and communication device 34, are embedded within an appendage 72. The appendage is a portion of the substrate 12 that extends outwardly and is not positioned between any relatively moving parts and, therefore, insulated from loads or deflections, thereby protecting the electronic devices embedded therein. In this embodiment, the communication device 34 comprises a radio transmitter and receiver, as evidenced by the RF antenna 74 embedded within the appendage.

The example application described above provides a sensor interface which may be used to diagnose various operating defects on a freight car.

In one embodiment, the sensor interface is part of a urethane substrate which is employed to improve the curving performance of the freight car. The substrate is made from thermoset polyurethane, specifically Adiprene L167 from Chemtura Corporation of Middleberry, Conn. The selection of substrate material is optimized for the application for which it is intended (e.g., a durable steering pad).

To diagnose various operating defects on the freight car, the sensor interface resolves and measures static and dynamic forces applied directed to it vertically, longitudinally, laterally and from a yawing motion. It also is able to measure temperature of the bearing adapter to assess the temperature of the bearing. Additionally, vertical shocks may also be measured.

Because of the high stresses generated in the interface 12 between the surfaces 14 and 16 in the regions where the sensors are located, the wires 30 may be supported and protected to resist damage. The support is made from a rigid, 50 Shore D polyurethane, which provides a relatively high tensile strength compared with the substrate material. Use of polyurethane for the support provides a good bond with the polyurethane used in the substrate, although other material types can be utilized.

The support may be located on the bearing adapter side of the substrate where deformation is minimized due to interlocking of the substrate and the bearing adapter, and it makes a good fit with the bearing adapter to minimize flexure of the support. Recessed channels may be included in the support for wiring, connectors and sensors. The channels provide some relief from high shear forces acting perpendicular to the direction of the wire. The channels for wires can be designed to meander if shear in multiple directions is anticipated. Further relief from high shear forces acting on the wires, connectors and sensors is provided by potting them in the channels using room temperature cure polyurethane or with substrate material itself.

Because there is little or no deformation of the wiring on the support, copper wires can be used. These are bonded into the channels using the potting compound, or substrate material itself. An alternative is to use laser direct structuring, a process developed by LPKF of Garbsen, Germany, which uses a modified support material and a laser to write wiring paths in the channels, with the conductive wiring being formed by subsequent chemical operations. A silver epoxy from AI Technology of Princeton Junction, N.J., can make an electrically conductive connection between the parts, and rivets can make a mechanical connection through and around the two parts.

At least three different types of sensors are used to measure three different properties. Pressure is measured by a thick film piezoresistive pressure sensor from Tekscan of Boston, Mass. Vibration is measured from a piezoelectric film sensor from MSI of Hampton, Va. Temperature is measured by a NTC thermistor from Epcos of Munich, Germany.

The energy storage needed to run the system comes from a long life battery made by Tadiran of Port Washington, N.Y. Alternatively, a piezoelectric film from MSI of Hampton, Va., is used to generate electric energy from vibrations in the environment to charge a capacitor. Alternatively, energy can come from the train's power system, taking power from ECP brakes or by use of magnetic elements mounted on a wheel and an adjacent part of the truck, thereby making use of the relative motion between the wheels and the side frame.

The electronics for this system may be a Crossbow OEM chip, operational amplifiers, voltage divider circuits, energy storage capacitor and an antenna.

Features and Further Illustrative Examples

It is a feature of this invention to provide protection for the sensors, as well as the other aforementioned components by having them embedded inside the flexible material forming the substrate or unstressed extensions thereof, which can provide sealing against moisture, vapor and chemical attack as well as protection against extremes of heat and cold, impact and shock.

It is a feature of this invention that the combination of embedded sensors, data processing units, communication devices and internal source of energy allows for the invention to function autonomously and, furthermore, to communicate sensor readings to the outside without making electrical connections by using electromagnetic, acoustic or optical means. For this latter effect, the substrate may be made entirely of or include a translucent or transparent polymeric material.

It is a feature of this invention that the sensors do not significantly affect the functionality of the substrate in its role as a compliant interface member, either by modifying its mechanical properties or by reducing its durability.

It is a feature of this invention that the substrate can be designed with position dependent and non-isotropic properties such as having a different stiffness along different axes or a different range of motion depending upon the direction of the motion.

It is a feature of this invention that the substrate be tolerant of abrasion and that the sensors be protected from the abrasive action at the interfacing surfaces of the substrate.

The substrate material may be a natural elastomeric material, such as rubber, or a synthetic polymer, for example, a thermoplastic or thermoset material. It is a feature of this invention that the materials of construction for the substrate and the component devices embedded therein are designed for compatibility to provide good mechanical bonding between the constituent parts so that the mechanical functions of the substrate are not degraded or otherwise compromised either as manufactured or during use because of separation or delamination of the components from the substrate.

The form of the substrate is not restricted to being a flat sheet, but can be any suitable shape as required to fill the space between the interfacing rigid objects. The shape may also be tailored to provide means for aligning the objects as well as to include appendages extending from the substrate which are not load bearing as required to house components other than the sensors. As indicated above, these characteristics preserve the hermetic seal that protects the various components from harsh environmental effects.

Since the load bearing substrate may deform when compressed or sheared in one or more directions, the communication links, e.g., the wiring and connectors linking the various components to one another must be able to accommodate the deformations. Two basic strategies can be used on wiring to meet this requirement: (i) create deformable wiring, or (ii) provide a support for the wiring that resists deformation. Connectors on the other hand need to provide a mechanical bond between the wiring and the components and tend to need some kind of support.

It is desirable that deformable wiring be able to accommodate large strains and high shear rates while demonstrating a long fatigue life. It is also advantageous to provide high conductivity to support good electrical connectivity. The wires preferably have a relatively low profile to enable large numbers of wires to coexist within the substrate. A flat steel spring has been found to be ideal in such applications, as have flexible circuit boards where a ripple has been induced in the flexible substrate, and even flexible conductive polymers, although the latter may exhibit a significant change in conductivity when deformed.

When wires are supported to resist deformation, the support should have a relatively high tensile strength compared with the substrate material around it. It should be thin, have a high shear resistance and, depending on the application, should bond well with the substrate material. The support should also demonstrate some flexibility and resistance to fatigue and large compressive forces. A wide range of materials can be used to support wires or other communication links, such as hard polyurethanes, glass filled nylon, carbon fiber or Kevlar® laminates or even steel. If the support used is conductive, then the wires must be insulated from it.

Any wire can be used with a deformation resistant support. Additionally, other wiring techniques can also be utilized when no significant deformation will occur. This includes using flexible circuits or laser direct structuring (LDS). The latter process involves creating a support with standard injection molding, using a laser-activable plastic grade that contains a metal-organic complex. The material is activated with a laser, which creates a seed layer for a subsequent electroless plating process, which grows 5 microns to 8 microns of copper on the laser-activated areas.

Deformable wiring provides an alternative to wiring that is supported where the deformation is relatively large.

The connector used to attach wires to sensors should provide both a highly conductive path and a mechanical bond between materials which may be dissimilar (such as bonding a metal wire to a flexible polymer substrate used for a thick film sensor). The connector should also withstand processing temperatures used to manufacture the substrate, as well as operating temperature regimes the substrate may be exposed to. The connector should also demonstrate some flexibility and good fatigue resistance. Silver filled conductive epoxy provides an excellent choice in this demanding environment.

Whereas conventional strain gauges rely on the elasticity of a supporting material, it is advantageous to employ stress measuring sensors in the invention that are not dependent on the elasticity of the substrate material for their function. This is due to the rheological properties of preferred substrate materials, which are generally highly non-linear and often allow for relatively large deformations.

Other sensors, such as temperature sensors, accelerometers, piezoelectric shock or vibration sensors, or incident radiation sensors, are chosen to have minimal or negligible effect on the behavior of the substrate as a compliant interface.

If flexible sensors, such as a thick film sensor mounted to a flexible circuit are used, a support may be required. The support should have similar properties to that described to support wiring and connectors. In addition, the support may be used to isolate sensing to one specific direction to enable, for instance, a sensor to measure a vertical load and not be affected by a lateral shear force.

Supports may also be used to provide additional strength for the sensor enabling it to survive in an environment that is otherwise beyond its mechanical design boundaries.

The various components such as the data processing and storage devices, the communication devices and the energy source preferably comprise electronic circuitry. These devices need not be planar, but can be configured to match the geometry of the substrate in conformity with the shape of the rigid objects which it separates.

The data processing unit preferably comprises electronic components such as a microprocessor which provides analog to digital conversion of sensor outputs, stores the data derived from the sensors, and under the command of software or embedded algorithms, manages communications and provides local analysis of stored data.

While the simplest version of the substrate according to the invention may be configured for direct electrical connection from outside the substrate to the embedded sensors to extract either raw analog or digital data generated by the sensors, benefits are to be obtained by operating on the signals derived from the sensors before transmitting them to the outside.

Such operations may include, but are not restricted to averaging, filtering to remove noise components, scaling, non-linear calibration and interpretation adjustments, spectral analysis, combination of readings from a multiplicity of sensors, which are not necessarily of the same type, drawing inferences about such readings, by means such as neural networks, to create assessments of prevailing conditions, reducing the information to be transmitted to remove redundancy in the data stream or encrypting or encoding the information for secure transmission or preparing alarm signals.

It is a further function of the electronic components in the substrate that the timing of data acquisition be controlled to be appropriate for the application. For example, some applications need bursts of intense data gathering activity while others need regular measurements at extended intervals. Provision of such a facility also allows conservation of electrical energy which may be limited. Microprocessors designed for embedded control systems can revert to low power rest states in which a clock still provides timing for a return to active status after a determined interval.

A further feature of a substrate able to communicate bi-directionally is that after installation, calibration tests can be done, so that the internal components are provided with the necessary conversion factors and adjustments to convert the raw data from sensors to appropriate magnitudes for later use.

It is a further function of the electronic components in the substrate that data acquired from the sensor or sensors can be stored in a data storage device, such as flash memory, either before processing to infer or detect prevailing conditions, or after analysis to provide a historic record.

Functions of the data storage device may include storing calibration data for the sensors, holding raw data from the sensors prior to doing statistical analysis for trend or other assessments, holding the correlation coefficients arising from such statistical analysis, holding spectral data derived from spectral analysis of previously retained sensor data and holding the results of other inferential analyses to create an interrogatable historic record for later delivery on schedule or on demand.

A further function of the data storage device is to store access codes and address keys so that networks of devices may be able to verify that communications traffic, interrogations and responses are legitimate and secure.

Yet another function of the data storage device is to provide for storage of extra software programs for use in the data processing unit. Such a facility allows for devices to have a wider repertoire of functionalities than can be built into the data processing unit itself. With suitable programming of the operating system for the data processing unit, this ability can be extended to allow reprogramming of devices after installation. Such functions are available as part of the suite of features in wireless sensor networks currently manufactured by Crossbow, Inc., of San Jose, Calif. These devices are provided with two-way communication capability via radio/processor circuitry that is controlled via an operating system.

The operating system runs software that allows the sensors to interface with the radio/processor circuitry and from there to outside processing systems such as personal computers, personal digital assistants or the internet, as well as with other networks. The use of software provides great versatility and allows for programmability of the embedded devices that can be used to change functionality or make repairs to damaged or defective code.

It is a further function of the electronic components in the substrate that the timing of the transmissions of outgoing data can be controlled. The data may be transmitted at preplanned intervals or on receipt of a signal from outside. For example, the device may be made to respond to a request for information as if it were an RFID tag. The requesting signal does not have to be of the same type as the transmitted response signal. For example, pulses of light might form the request, being detected through the translucent polymeric material forming the substrate, while the response could be by electromagnetic induction. Numerous other combinations can be envisioned as appropriate to the application.

While it is convenient to consider the above functionality of the electronic components as being provided by a microprocessor, this may be neither necessary nor economic. Depending on the application, as noted above, the required functions may be provided by an application specific integrated circuit, by a field programmable gate array, by a digital signal processing device or various combinations thereof including analog circuit components, as well as discrete logic and digital components. The essential function is to be able to retrieve the measurements from the sensors and to prepare them for transmission.

The drawing of inferences about prevailing conditions may be based on comparison of readings from various sensors. For example, a substrate bearing a vertical load may detect that the load was rocking because readings of pressure near opposite edges of the substrate were varying out of phase with each other. Cyclic behavior might be a local mechanical problem; acyclic behavior might be due to earthquake or other disturbance.

Given that a substrate can transmit and receive signals, then substrates can be configured to interoperate so that readings from more than one substrate can be combined. For example, ad hoc networks conforming to standards for information technology such as IEEE802.15.4 (Telecommunication and Information Exchange Between Systems hereby incorporated by reference herein) provide the basis for such interactions. Such a combination of information can be processed with a microprocessor and radio combination such as the "Mica" units made by Crossbow, Inc., of San Jose, Calif.

The communication devices embedded within the substrate may communicate locally processed sensor readings to the outside without making electrical connections by using electromagnetic, acoustic or optical means. A feature of this system is that the communication device can operate within the constraints imposed by its internally generated energy source and storage. Schemes for low power radio frequency communication, such as mesh networking, provide an approach for communicating over much greater distances than that provided by a single low power RF transmitter.

An alternative feature of this invention provides for wired communication and power.

The invention provides for the internal generation of sufficient electrical energy for its functioning over an indefinite period by means such as scavenging the effects of small relative motions or vibrations of the bounding objects, using piezoelectric generation or electro-mechanical micro-generators or similar components, to power the aforesaid sensors, electronic circuitry and communication devices when such power is needed.

An alternative is to use thermally generated electrical energy or photo-electric generation, including the use of a laser source of energy as and when needed.

An alternative feature of this invention allows the required electrical energy to be delivered by electromagnetic induction, either continuously or only when needed to make a measurement or extract data. For example, the small amount of energy needed could be extracted from the alternating magnetic field of an adjacent loop carrying mains current.

An alternative source for electrical energy is the use of small radioactive components which generate a small but persistent charge generation.

One embodiment of this invention allows the required electrical energy to be provided by electrochemical means, such as a fuel cell, for which fuel can be provided as needed.

Another source of energy is a chip scale battery.

It is also a feature of this invention that the electrical energy, if generated slowly over an extended period, can be stored by electrochemical means in a battery or by electronic capacitors for use on the occasions when greater electrical power is required than is produced on a continuous basis.

An alternative feature of this invention is the use of a high energy density battery as a non-rechargeable power storage device. An example is a lithium thionyl chloride battery.

What is claimed is:

1. A railcar truck sensor interface positioned between a bearing adapter and a side frame of a railcar truck, said sensor interface comprising:
    a flexible and resilient substrate having a first surface interfacable with said bearing adapter and a second surface interfacable with said side frame, the substrate allowing for limited relative movement of said adapter and said side frame; and
    at least one sensor embedded within said flexible and resilient substrate, said sensor being adapted to measure a parameter and generate an electrical signal indicative of said parameter.

2. A railcar truck sensor interface according to claim 1, wherein said parameter is selected from the group consisting of voltage differential, luminous intensity, sound intensity, heat flux, electrical current, moisture diffusion, chemical species diffusion, magnetic flux, neutron flux, ionizing radiation, temperature, displacement, velocity, acceleration, stress, strain, pressure and force, and combinations thereof.

3. A railcar truck sensor interface according to claim 1 wherein said substrate is formed as part of a load bearing pad disposed between and interfacing with said bearing adapter and said side frame so as to transmit a load therebetween.

4. A railcar truck sensor interface according to claim 1 wherein said substrate is an elastomeric load bearing substrate.

5. A railcar truck sensor interface according to claim 1 wherein said sensor is configured to measure a parameter of said substrate.

6. A railcar truck sensor interface according to claim 1, further comprising:
    a data processing unit in communication with said sensor for receiving and processing said signals;
    a communication device adapted to transmit data from said data processing unit; and
    a power source providing electrical power to said sensor, said data processing unit, and said communication device.

7. A railcar truck sensor interface according to claim 6, wherein said data processing unit is embedded within said substrate.

8. A railcar truck sensor interface according to claim 7, wherein at least one of said first and second surfaces has a dimple positioned therein overlying said data processing unit.

9. A railcar truck sensor interface according to claim 6, wherein said communication device is embedded within said substrate.

10. A railcar truck sensor interface according to claim 9, wherein at least one of said first and second surfaces has a dimple positioned therein overlying said communication device.

11. A railcar truck sensor interface according to claim 6, wherein said power source is embedded within said substrate.

12. A railcar truck sensor interface according to claim 11, wherein at least one of said first and second surfaces has a dimple positioned therein overlying said power source.

13. A railcar truck sensor interface according to claim 11, wherein said power source comprises a generator which derives energy from relative motion between said bearing adapter and said side frame.

14. A railcar truck sensor interface according to claim 11, wherein said power source comprises a vibrating magnetic induction device which derives energy from motion of the sensor interface.

15. A railcar truck sensor interface according to claim 6, further comprising an appendage extending from said substrate and positioned external to the space between said bearing adapter and said side frame, said data processing unit and said communication device being embedded within said appendage.

16. A railcar truck sensor interface according to claim 15, wherein said power source is embedded within said appendage.

17. A railcar truck sensor interface according to claim 15, further comprising a data storage device embedded within said appendage.

18. A railcar truck sensor interface positioned between two relatively rigid objects that are moveable relative to one another and which transmit a load from one to the other, wherein one of said rigid objects is a bearing adapter and the other of said rigid objects is a side frame of the railcar truck, said sensor interface comprising:
   a flexible and resilient load bearing substrate having a first surface that interfaces with one of said objects and a second surface that interfaces with the other of said objects, said substrate serving as a compliant interface allowing for limited relative movement between said objects and transmitting the load between said objects;
   a plurality of sensors embedded within said flexible substrate, said sensor being adapted to measure a plurality of parameters selected from the group consisting of temperature, displacement, velocity, acceleration, stress, strain, pressure, and force and combinations thereof, said sensors generating electrical signals indicative of said parameters;
   a data processing unit embedded within said substrate and in communication with said sensor for receiving and processing said signals;
   a communication device embedded within said substrate and adapted to transmit data from said data processing unit; and
   a power source embedded within said substrate and providing electrical power to said sensor, said data processing unit, and said communication device.

19. A sensor interface according to claim 18, wherein at least one of said first and second surfaces has a first dimple positioned therein and overlying said data processing unit, a second dimple overlying said communication device, and a third dimple overlying said power source.

20. A sensor interface according to claim 18, further comprising an appendage extending from said substrate and positioned external to a space between said objects, said data processing unit, said communication device and said power source being embedded within said appendage.

21. A sensor interface according to claim 18 wherein said substrate is formed as part of a pad disposed between and interfacing with said two objects.

22. A sensor interface according to claim 18 wherein said substrate is formed of an elastomeric pad.

23. A method of measuring and evaluating a physical parameter at an interface of a railcar truck between a bearing adapter and a side frame of said truck, said method comprising:
   providing a flexible, compliant load bearing substrate positioned between said bearing adapter and said side frame, said substrate comprising at least one sensor embedded therein and transmitting a load between said bearing adapter and said side frame; and
   measuring said parameter using said sensor, said sensor generating electrical signals indicative of said parameter.

24. A method according to claim 23, wherein said measuring step further comprises measuring a parameter selected from the group consisting of voltage differential, luminous intensity, sound intensity, heat flux, electrical current, moisture diffusion, chemical species diffusion, magnetic flux, neutron flux, ionizing radiation, temperature, displacement, velocity, acceleration, stress, strain, pressure and force and combinations thereof.

25. A method in accordance with claim 23 further comprising the steps of:
   providing a data processing unit in communication with said sensor;
   providing a communication device adapted to transmit data from said data processing unit;
   providing a power source for powering said sensor, said data processing unit and said communication device;
   said data processing unit receiving said signals from said sensor;
   said data processing unit performing operations on said signals, said operations selected from the group consisting of averaging, filtering, comparing, scaling, calibrating, spectral analysis, encryption, analog to digital conversion, and combinations thereof; and
   using said communication device to transmit information derived from said signals by said data processing unit.

26. A railcar truck having a sensor interface positioned between a bearing adapter and a side frame of said truck within a retainer pocket of said truck, said sensor interface comprising:
   a flexible and compliant load bearing pad having a first surface that interfaces with said bearing adapter and a second surface that interfaces with said side frame in said retainer pocket, said pad being positioned to bear and transmit a load between said side frame and said adapter, said pad allowing for relative movement between the adapter and said side frame;
   at least one sensor embedded within said pad, said sensor being adapted to measure at least one parameter selected from the group consisting of temperature, displacement, velocity, acceleration, stress, strain, pressure and force, and combinations thereof, said sensor generating an electrical signal indicative of said parameter;

a data processing unit in communication with said sensor for receiving and processing said signals;

a communication device adapted to transmit data from said data processing unit; and a power source providing electrical power to said sensor, said data processing unit, and said communication device.

27. A railcar truck according to claim 26, wherein said power source is embedded within said pad, and wherein said power source comprises a generator which derives energy from relative motion between said bearing adapter and said side frame.

28. A railcar truck according to claim 26, further comprising a data storage device.

29. A railcar truck according to claim 26 wherein said power source is a thermally generated power source.

30. A railcar truck according to claim 26 wherein said pad comprises an elastomeric pad.

31. A railcar truck according to claim 26, wherein said data processing unit is embedded within said pad.

32. A railcar truck according to claim 31, wherein said data processing unit comprises a component selected from the group consisting of analog signal conditioning devices, analog electrical circuits, microprocessors, application specific integrated circuits, field programmable gate arrays and digital signal processing devices and combinations thereof.

33. A railcar truck according to claim 26, further comprising an appendage extending from said pad and positioned external to a space between said bearing adapter and said side frame, said data processing unit and said communication device being embedded within said appendage.

34. A railcar truck according to claim 33, wherein said power source is embedded within said appendage.

35. A railcar truck, comprising:

a railcar truck side frame;

a bearing adapter;

a sensor interface disposed between said bearing adapter and said side frame of said truck, said sensor interface comprising a flexible and resilient substrate positioned to allow for limited movement of said adapter and said side frame relative to one another and to transmit a load of said side frame through said substrate to said bearing adapter; and at least one sensor embedded within said substrate, said sensor being adapted to measure a parameter and generate an electrical signal indicative of said parameter.

* * * * *